(12) United States Patent
Galbreath et al.

(10) Patent No.: US 9,703,879 B2
(45) Date of Patent: *Jul. 11, 2017

(54) GRAPH SERVER QUERYING FOR MANAGING SOCIAL NETWORK INFORMATION FLOW

(71) Applicant: Facebook, Inc., Menlo Park, CA (US)

(72) Inventors: Nicholas Galbreath, San Francisco, CA (US); Mirko Predosin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,806

(22) Filed: Dec. 30, 2015

(65) Prior Publication Data

US 2016/0110463 A1    Apr. 21, 2016

Related U.S. Application Data

(63) Continuation of application No. 14/048,925, filed on Oct. 8, 2013, now Pat. No. 9,241,027, which is a continuation of application No. 10/854,054, filed on May 26, 2004, now Pat. No. 8,572,221.

(51) Int. Cl.
    *G06F 15/173*    (2006.01)
    *G06F 15/16*     (2006.01)
    *G06F 17/30*     (2006.01)
    *G06Q 30/02*     (2012.01)
    *H04L 29/08*     (2006.01)
    *H04L 29/06*     (2006.01)

(52) U.S. Cl.
    CPC ....... *G06F 17/30867* (2013.01); *G06Q 30/02* (2013.01); *H04L 65/403* (2013.01); *H04L 67/10* (2013.01); *H04L 67/306* (2013.01)

(58) Field of Classification Search
    CPC .................................. G06F 17/30867
    See application file for complete search history.

(56) References Cited

U.S. PATENT DOCUMENTS

| 4,987,554 A | 1/1991 | Kaufman |
| 4,989,141 A | 1/1991 | Lyons |
| 5,101,475 A | 3/1992 | Kaufman |

(Continued)

FOREIGN PATENT DOCUMENTS

WO     98/49636 A1    11/1998

OTHER PUBLICATIONS

"Introduction to Structured Query Language," 2000, pp. 1-33, http:/w3 .one.net/about.jhoffmann/sqltuthtm.

(Continued)

*Primary Examiner* — Gerald Smarth
(74) *Attorney, Agent, or Firm* — Baker Botts L.L.P.

(57) ABSTRACT

An online social network is managed using one server for database management tasks and another server, preferably in a distributed configuration, for CPU-intensive computational tasks, such as finding a shortest path between two members or a degree of separation between two members. The additional server has a memory device containing relationship information between members of the online social network and carries out the CPU-intensive computational tasks using this memory device. With this configuration, the number of database lookups is decreased and processing speed is thereby increased.

18 Claims, 6 Drawing Sheets

(56) References Cited

U.S. PATENT DOCUMENTS

| | | |
|---|---|---|
| 5,189,608 A | 2/1993 | Lyons |
| 5,257,365 A | 10/1993 | Powers |
| 5,278,966 A | 1/1994 | Parks |
| 5,359,724 A | 10/1994 | Earle |
| 5,361,385 A | 11/1994 | Bakalash |
| 5,379,419 A | 1/1995 | Heffernan |
| 5,706,495 A | 1/1998 | Chadha |
| 5,745,764 A | 4/1998 | Leach |
| 5,765,028 A | 6/1998 | Gladden |
| 5,781,896 A | 7/1998 | Dalal |
| 5,794,228 A | 8/1998 | French |
| 5,794,229 A | 8/1998 | French |
| 5,794,246 A | 8/1998 | Sankaran |
| 5,799,300 A | 8/1998 | Agrawal |
| 5,805,885 A | 9/1998 | Leach |
| 5,822,751 A | 10/1998 | Gray |
| 5,832,475 A | 11/1998 | Agrawal |
| 5,850,547 A | 12/1998 | Waddington |
| 5,852,821 A | 12/1998 | Chen |
| 5,857,184 A | 1/1999 | Lynch |
| 5,864,857 A | 1/1999 | Ohata |
| 5,890,151 A | 3/1999 | Agrawal |
| 5,901,287 A | 5/1999 | Bull |
| 5,905,985 A | 5/1999 | Malloy |
| 5,915,257 A | 6/1999 | Gartung |
| 5,918,225 A | 6/1999 | White |
| 5,918,232 A | 6/1999 | Pouschine |
| 5,926,818 A | 7/1999 | Malloy |
| 5,926,820 A | 7/1999 | Agrawal |
| 5,940,822 A | 8/1999 | Haderlie |
| 5,950,200 A | 9/1999 | Sudai |
| 5,963,936 A | 10/1999 | Cochrane |
| 5,963,951 A | 10/1999 | Collins |
| 5,978,768 A | 11/1999 | McGovern |
| 5,978,788 A | 11/1999 | Castelli |
| 5,978,796 A | 11/1999 | Malloy |
| 5,987,467 A | 11/1999 | Ross |
| 5,991,754 A | 11/1999 | Raitto |
| 5,999,192 A | 12/1999 | Selfridge |
| 6,003,029 A | 12/1999 | Agrawal |
| 6,006,216 A | 12/1999 | Griffin |
| 6,023,695 A | 2/2000 | Osborn |
| 6,034,697 A | 3/2000 | Becker |
| 6,052,122 A | 4/2000 | Sutcliffe |
| 6,061,681 A | 5/2000 | Collins |
| 6,064,999 A | 5/2000 | Dalal |
| 6,073,105 A | 6/2000 | Sutcliffe |
| 6,073,138 A | 6/2000 | de l'Etrax |
| 6,108,647 A | 8/2000 | Poosala |
| 6,115,705 A | 9/2000 | Larson |
| 6,122,628 A | 9/2000 | Castelli |
| 6,134,541 A | 10/2000 | Castelli |
| 6,141,655 A | 10/2000 | Johnson |
| 6,151,601 A | 11/2000 | Papierniak |
| 6,161,103 A | 12/2000 | Raunder |
| 6,163,774 A | 12/2000 | Lore |
| 6,173,310 B1 | 1/2001 | Yost |
| 6,175,831 B1 | 1/2001 | Weinreich |
| 6,182,060 B1 | 1/2001 | Hedgcock |
| 6,182,061 B1 | 1/2001 | Matsuzawa |
| 6,189,004 B1 | 2/2001 | Rassen |
| 6,205,447 B1 | 3/2001 | Malloy |
| 6,208,975 B1 | 3/2001 | Bull |
| 6,209,036 B1 | 3/2001 | Aldred |
| 6,212,515 B1 | 4/2001 | Rogers |
| 6,212,524 B1 | 4/2001 | Weissman |
| 6,212,617 B1 | 4/2001 | Hardwick |
| 6,249,282 B1 | 6/2001 | Sutcliffe |
| 6,249,791 B1 | 6/2001 | Osborn |
| 6,269,369 B1 | 7/2001 | Robertson |
| 6,269,393 B1 | 7/2001 | Yost |
| 6,317,750 B1 | 11/2001 | Tortolani |
| 6,321,241 B1 | 11/2001 | Gartung |
| 6,324,533 B1 | 11/2001 | Agrawal |
| 6,324,541 B1 | 11/2001 | de l'Etraz |
| 6,330,564 B1 | 12/2001 | Hellerstein |
| 6,347,332 B1 | 2/2002 | Malet |
| 6,363,427 B1 | 3/2002 | Teibel |
| 6,366,962 B1 | 4/2002 | Teibel |
| 6,370,510 B1 | 4/2002 | McGovern |
| 6,374,234 B1 | 4/2002 | Netz |
| 6,385,301 B1 | 5/2002 | Nolting |
| 6,385,604 B1 | 5/2002 | Bakalash |
| 6,397,195 B1 | 5/2002 | Pinard |
| 6,405,208 B1 | 6/2002 | Raghavan |
| 6,408,292 B1 | 6/2002 | Bakalash |
| 6,408,309 B1 | 6/2002 | Agarwal |
| 6,434,544 B1 | 8/2002 | Bakalash |
| 6,473,764 B1 | 10/2002 | Petculescu |
| 6,477,536 B1 | 11/2002 | Pasumansky |
| 6,484,179 B1 | 11/2002 | Roccaforte |
| 6,493,728 B1 | 12/2002 | Berger |
| 6,535,872 B1 | 3/2003 | Castelli |
| 6,542,748 B2 | 4/2003 | Hendrey |
| 6,549,907 B1 | 4/2003 | Fayyad |
| 6,587,547 B1 | 7/2003 | Zirngibl |
| 6,594,672 B1 | 7/2003 | Lampson |
| 6,601,062 B1 | 7/2003 | Deshpande |
| 6,629,094 B1 | 9/2003 | Colby |
| 6,640,218 B1 | 10/2003 | Golding |
| 6,643,661 B2 | 11/2003 | Polizzi |
| 6,662,174 B2 | 12/2003 | Shah |
| 6,732,115 B2 | 5/2004 | Shah |
| 6,735,568 B1 | 5/2004 | Buckwalter |
| 6,748,394 B2 | 6/2004 | Shah |
| 6,763,357 B1 | 7/2004 | Deshpande |
| 6,766,325 B1 | 7/2004 | Pasumansky |
| 6,832,263 B2 | 12/2004 | Polizzi |
| 7,069,308 B2 | 6/2006 | Abrams |
| 7,117,254 B2 | 10/2006 | Lunt |
| 7,120,619 B2 | 10/2006 | Drucker |
| 7,177,880 B2 | 2/2007 | Ruvolo |
| 7,188,153 B2 | 3/2007 | Lunt |
| 7,269,590 B2* | 9/2007 | Hull ........... G06Q 10/10 707/770 |
| 7,478,078 B2 | 1/2009 | Lunt |
| 7,512,612 B1 | 3/2009 | Akella |
| 7,895,357 B1 | 2/2011 | Walker |
| 7,958,457 B1 | 6/2011 | Brandenberg |
| 2002/0016924 A1 | 2/2002 | Shah |
| 2002/0023122 A1 | 2/2002 | Polizzi |
| 2002/0026478 A1 | 2/2002 | Rodhers |
| 2002/0029207 A1 | 3/2002 | Bakalash |
| 2002/0038229 A1 | 3/2002 | Shah |
| 2002/0038297 A1 | 3/2002 | Shah |
| 2002/0086676 A1* | 7/2002 | Hendrey ........... H04W 4/02 455/445 |
| 2002/0099692 A1 | 7/2002 | Shah |
| 2002/0111173 A1* | 8/2002 | Hendrey ........... H04W 4/206 455/456.3 |
| 2002/0154171 A1 | 10/2002 | Lee |
| 2003/0115194 A1 | 6/2003 | Pitts |
| 2003/0154194 A1 | 8/2003 | Jonas |
| 2004/0034601 A1 | 2/2004 | Kreuzer |
| 2004/0088322 A1 | 5/2004 | Elder |
| 2004/0088325 A1 | 5/2004 | Elder |
| 2004/0101212 A1* | 5/2004 | Fedorovskaya ... G06F 17/30265 382/305 |
| 2004/0144301 A1 | 7/2004 | Neudeck |
| 2004/0148275 A1* | 7/2004 | Achlioptas ........ G06F 17/30867 |
| 2005/0091202 A1 | 4/2005 | Thomas |
| 2005/0165785 A1 | 7/2005 | Malkin |
| 2005/0177385 A1 | 8/2005 | Hull |
| 2005/0235062 A1 | 10/2005 | Lunt |
| 2005/0243736 A1 | 11/2005 | Faloutsos |
| 2005/0256866 A1 | 11/2005 | Lu |
| 2005/0278443 A1* | 12/2005 | Winner ........... G06Q 30/02 709/224 |
| 2007/0005750 A1 | 1/2007 | Lunt |

(56) References Cited

U.S. PATENT DOCUMENTS

2007/0244854 A1  10/2007  Nevill-Manning
2008/0004944 A1   1/2008  Calabria

OTHER PUBLICATIONS

"Performance Management Product Information," ENT, Jul. 17, 1999, 2 pages.
"See Data from All Angles with Multidimensional Database Software" SAS Institute Inc., 2001, 1 page, www.sas.com/products/mddb/indexhtml.
"The Art of Indexing," A White Paper by DISC, Oct. 1999, pp. 3-30, Dynamic Information Systems Corporation.
Agrawal, S. et al., "On the Computation of Multidimensional Aggregates," Presented at the 22nd VLDB Conference, 1996, pp. 1-16.
Agrawal, R. et al., "Modeling Multidimensional Databases," IBM Almaden Research Center, 1995; Presented at the 13th International Conference on Data Engineering Apr. 1997, pp. 1-23.
Albrecht, J. et al. "Management of Multidimensional Aggregates for Efficient Online Analytical Processing," Database Engineering and Applications, 1999, Int'l Symposium Proceedings Montreal, Quebec, Canada.
Albrecht, J. et al., "Aggregate-Based Query Processing in a Parallel Data Warehouse Server," Proceedings of the Tenth International Workshop on Database and Expert Systems Applications, Sep. 1-3, 1999 pp. 40-44.
Chaudhuri, S. et al., "An Overview of Data Warehousing and OLAP Technology", SIGMOD Record, New York, NY Mar. 1997, vol. 26, No. 1, Apr. 1997.
Cheung, D.W. et al., "Towards the Building of a Dense-Region Based OLAP System," Data and Knowledge Engineering, 2001, pp. 1-27, vol. 36, No. 1, http://www.elsevier.nl/gei-ng/10/16/74/62/24/24/ abstract.html.
Colby, L.S. et al. "Red Brick Vista: Aggregate Computation and Management", Data Engineering 1998 Proceedings, 14th Int'l Conference in Orlando, Fl., Feb. 23-27, 1998.
Colliat, G., "OLAP, Relational, and Multidimensional Database Systems," SIGMOD Record, Sep. 1996, pp. 64-69, vol. 25, No. 3.
Date, C.J., "An Introduction to Database Systems," 2000, pp. 250, 266, 289-326, Addison-Wesley, Seventh Edition.
Duhl, J. et al., "A Performance Comparison of Object and Relational Databases Using the Sun Benchmark," Proceedings of the Conference on Object Oriented Programming Systems Languages and Applications, Sep. 25-30, 1988, pp. 153-163.
Elkins, S.B., "Open OLAP," DBMS, Apr. 1998, pp. 1-7, http://www.dbmsmag.com/9804d14.html.
Gupta, H. V., et al., "Index Selection for OLAP", Proceedings of the 13th Int'l Conference on Data Engineering, Apr. 7-11, 1997, pp. 208-219.
Harinarayan, V. et al., "Implementing Data Cubes Efficiently," Presented at the ACM SIGMOD International Conference on Management9fData.,1211 205-216, Jun. 1996.
Harrington, J .L., "Relational Database Design Clearly Explained," 1998, pp. v-xiii, 1-62, Morgan Kaufman.
Hellerstein, J .M. et al., "Online Aggregation," Presented at the ACM SIGMOD International Conference on Management of Data, May 1997, Tucson, Arizona, pp. 1-12, http://www.acm.org/pubs/citations/proceedings/mod/253260/p171-hellerstein/.
Hellerstein, J .M., "Optimization Techniques for Queries with Expensive Methods," ACM Transactions on Database Systems (TODS), 1998, pp. 113-157, vol. 23, No. 2.
Ho, C. et al., "Range Queries in OLAP Data Cubes," Presented at the ACM SIGMOD International Conference on Management of Data. pp. 1-16, http://www.acm.org/pubs/citations/proceedings/mod/253260/p73 -ho/, May 1997.
Kimball, R., "Aggregate Navigation With (Almost) No MetaData," 1996, pp. 1-8, http://www.dbmsmag.com/9608d54.html.
Kimball, R., "The Aggregate Navigator: How to Optimize Your Data Warehouse Using Aggregates Without Driving Your End Users Crazy," DBMS, Nov. 1995, www.dbmsmag.com.
Korn, F., et al., "Efficiently Supporting Ad Hoc Queries in Large Datasets of Time Sequences," Presented at ACM SIGMOD International Conference on Management of Data, May 11-15, 1997, pp. 1-22, http://www.acm.org/pubs/citations/proceedings/mod/253260. p.289-korn/.
Li, C. et al., "Optimizing Statistical Queries by Exploiting Orthogonality and Interval Properties of Grouping Relations," Presented at the 8th International Conference on Scientific & Statistical Database Management, pp. 1-10, Jun. 1996.
Li, C., et al. "A Data Model for Supporting On-Line Analytical Processing," Presented at the International Conference on Information and Knowledge Management, pp. 81-88, 1996.
McKie, S., "Essbase 4.0," DBMS Online, Jul. 1996, pp. 1-4, http://www.dbmsmag.com/9607d13.html.
Pedersen, T.B., Aspects of Data Modeling and Query Processing for Complex Multidimensional Data, 2000, pp. 1-180, Danish Academy of Technical Sciences.
Pendse, N., "The Origins of Today's OLAP Products," Feb. 6, 2003, pp. 1-7, http://www.olapreport.com/origins.htm.
Pourabbas, E. et al., "Characterization of Hierarchies and Some Operators in OLAP Environment," Presented at the ACM 2 International Workshop on Data Warehousing and OLAP, p. 1-17, Nov. 1999.
Pourabbas, E. et al., "Hierarchies and Relative Operators in the OLAP Environment," SIGMOD Record, Mar. 2000, pp. 1-8, v 61. 29, No. 1, Apr. 2000.
Salem, K., et al., "How to Roll a Join: Asynchronous Incremental View Maintenance," Presented at ACM SIGMOD on Management of Data and Symposium on Principles of Database Systems, May 15-18, 2000, pp. 1-13, http://www.acm.org/pubs/citations/proceedings/mod/342009/p129-salem/#abstract.
Widmann, "Efficient Execution of Operations in a DBMS for Multidimensional Arrays", p. 1-11, May 1997.
Zhao, Y et al. "Array-Based Evaluation of Multi-Dimensional Queries in Object-Relational Database Systems," Data Engineering, 1998 Proceedings, 14th Int'l Conference in Orlando, Fl., Feb. 23-27, 1998.

\* cited by examiner

FIG. 3

Adjacency List

| |
|---|
| ME: A, B, C |
| A: ME, F, G |
| B: ME, H |
| C: ME, D, E |
| D: C, I, J |
| E: C, K |
| F: A, L |
| G: A, H |
| H: B, G |
| I: D, N |
| J: D |
| K: E |
| L: F, M |
| M: L |
| N: I, O |
| O: N |
| P: Q, R |
| Q: P, R |
| R: P, Q |
| S: |
| T: U |
| U: T |

US 9,703,879 B2

GRAPH SERVER QUERYING FOR MANAGING SOCIAL NETWORK INFORMATION FLOW

RELATED APPLICATIONS

This present application is a continuation under 35 U.S.C. §120 of U.S. patent application Ser. No. 14/048,925, filed Oct. 8, 2013, which is a continuation under 35 U.S.C. §120 of U.S. patent application Ser. No. 10/854,054, filed May 26, 2004, each of which is incorporated herein by reference.

BACKGROUND

The present invention generally relates to a system and method for managing an online social network, and more specifically, to a system and method for managing information exchange between members of an online social network.

Online social networking sites have been rapidly gaining in popularity, and operators of online social networking sites have been adding servers and switches to their infrastructure to keep up with the increasing demand. Keeping up with the increasing demand has, however, proved to be difficult for two reasons. First, online social networking sites are virally marketed, as current members actively solicit nonmembers to sign up and join the network, and as a result, its growth has been very rapid. Second, the load on the social networking site is dependent not only on the total number of members but also on the total number of relationships. Because a member typically has multiple relationships, this means that the load increase associated with each new member is much greater than typical.

SUMMARY

The present invention deals with the system load demands by improving the processing efficiencies of the online social networking site. The improvement in the processing efficiencies is achieved by providing one or more graph servers to be used in combination with the site's application server. The application server is configured to handle database management tasks, and the graph servers are configured to handle CPU-intensive computational tasks.

More specifically, the application server manages a database that contains member profile information and member relationship information. The graph servers keep track of how the members are socially connected to one another (hereinafter referred to as, "social network map") in a dedicated memory device, and process and respond to queries from the application server using the social network map stored in the dedicated memory device. The social network map that is stored in the dedicated memory device of the graph servers is updated to reflect any changes to the member relationship information that are made in the database.

Because the present invention processes relationship information using a social network map that is stored in a dedicated memory device, the number of database lookups is decreased and an improvement in the processing speed is achieved. Depending on the number of relationships that are tracked, a dramatic improvement in the processing speed might be achieved with the present invention.

BRIEF DESCRIPTION OF THE DRAWINGS

FIG. 3 is a sample adjacency list that is maintained by the graphs servers of the present invention;

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
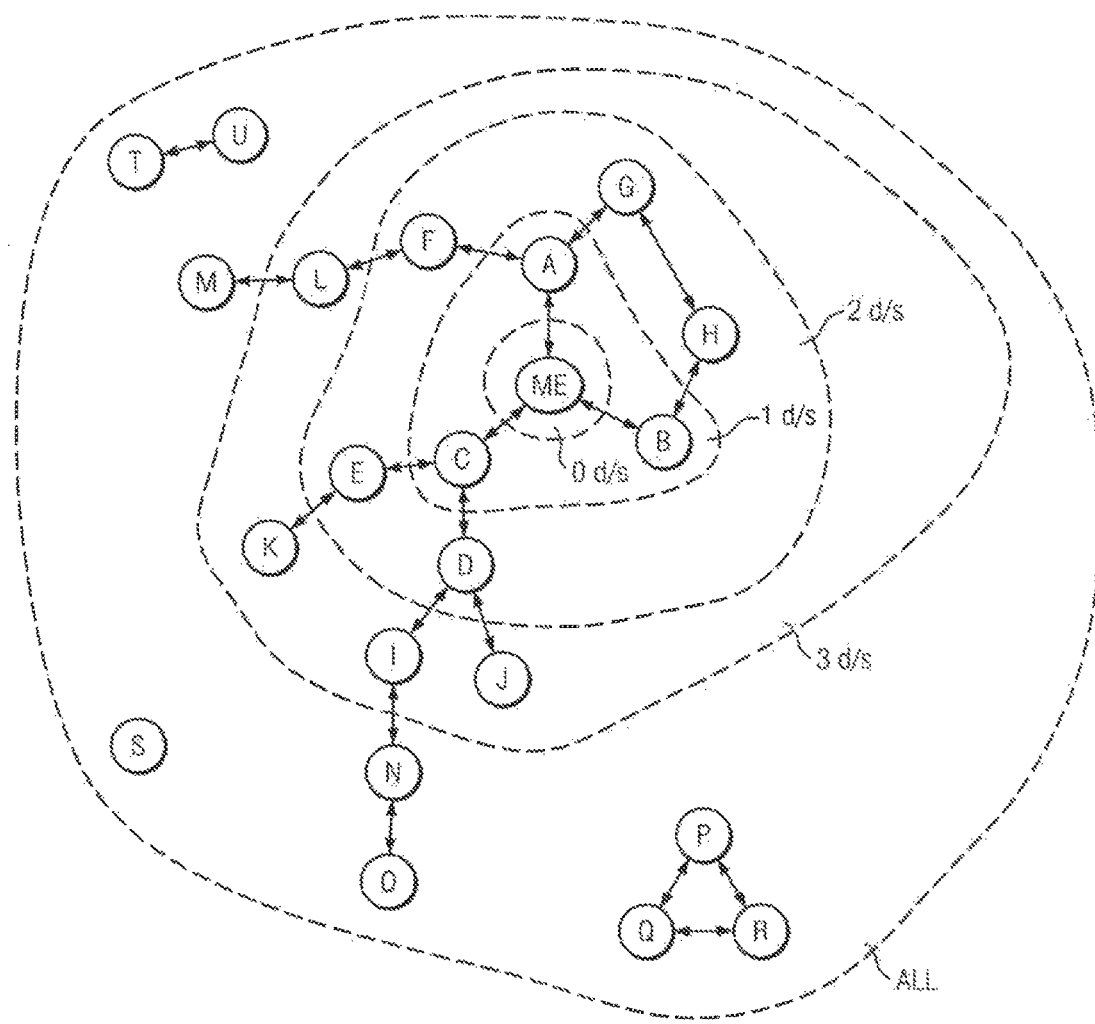
FIG. 1 is a diagram that conceptually represents the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
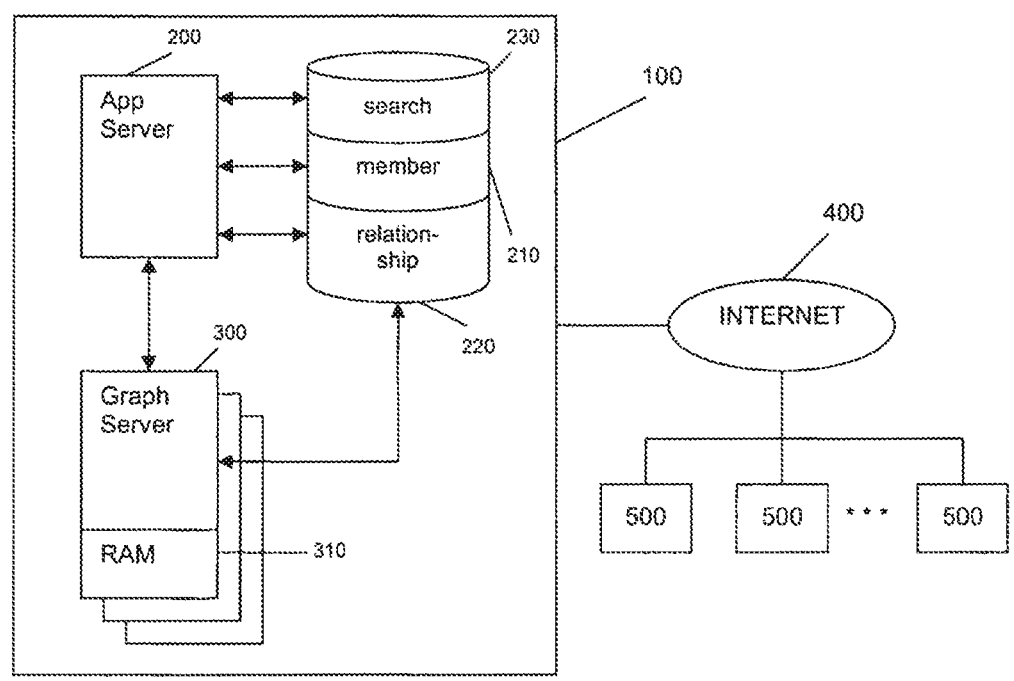
FIG. 2 is a block diagram illustrating the system for managing an online social network according to an embodiment of the present invention.

FIG. 2 is a block diagram illustrating a system for managing an online social network. As shown, FIG. 2 illustrates a computer system 100, including an application server 200 and distributed graph servers 300. The computer system 100 is connected to a network 400, e.g., the Internet, and accessible over the network by a plurality of computers, which are collectively designated as 500.

The application server 200 manages a member database 210, a relationship database 220 and a search database 230. The member database 210 contains profile information for each of the members in the online social network managed by the computer system 100. The profile information may include, among other things: a unique member identifier, name, age, gender, location, hometown, a pointer to an image file, listing of interests, attributes, etc. The profile information also includes VISIBILITY and CONTACTABILITY settings, the uses of which are described below in connection with FIGS. 4 and 5.

The relationship database 220 stores member relationship information in the following format: (MemberID_1, MemberID_2, Time, Add/Delete). MemberID_1 and MemberID_2 identify the two members whose relationship is defined by this input. Time is a variable corresponding to the time stamp of this input. Add/Delete is a variable indicating whether the friendship between MemberID_1 and MemberID_2 is to be added or deleted.

In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The member database 210, the relationship database 220, and the search database 230 are depicted separately in the block diagram of FIG. 2 to illustrate that each performs a different function. The databases 210, 220, 230 may each represent a different database system, module, or software; or any two of the three or all three may be parts of the same database system, module, or software.

The application server 200 also manages the information exchange requests that it receives from the remote computers 500. The information exchange requests may be a request to view a member's profile (FIG. 4), a request to send messages to a member (FIG. 5), or a search request (FIG. 6). The application server 200 relies on the distributed graph servers 300 to process certain CPU-intensive tasks that are part of the information exchange request. The graph servers 300 receive a query from the application server 200, process the query and return the query results to the application server 200.

The graph servers 300 have a dedicated memory device 310, such as a random access memory (RAM), in which an adjacency list that reflects the member relationship information is stored. A sample adjacency list that reflects the social network map of FIG. 1 is shown in FIG. 3. A list item is generated for each member and contains a member identifier for that member and member identifier(s) corresponding to friend(s) of that member. As an alternative to the adjacency list, an adjacency matrix or any other graph data structure may be used.

The graph servers 300, on a fixed interval, e.g., every five minutes, check the relationship database 220 for any incremental changes to the member relationship information. If there is, e.g., if (current time−5 minutes) is less than or equal to the time stamp corresponding to an entry in the relationship database 220, the adjacency list stored in the dedicated memory device 510 is updated to reflect such incremental change. If a friendship is to be added, the adjacency list item for MemberID_1 is amended to add MemberID_2 and the adjacency list item for MemberID_2 is amended to add MemberID_1. If a friendship is to be deleted, the adjacency list item for MemberID_1 is amended to delete MemberID_2 and the adjacency list item for MemberID_2 is amended to delete MemberID_1. Alternatively, the adjacency list can be updated in real time, i.e., synchronously with the updates to the relationship database 220.

The queries processed by the graph servers 300 include:

List_of_Members (M1, N d/s), which returns a list of member identifiers of all members who are exactly N d/s from member M1;

No_of_Members (M1, N d/s), which returns a raw number indicating the number of members who are exactly N d/s from member M1;

Get_Network (M1, N d/s), which returns a list of member identifiers of all members that are within N d/s from member M1;

Shortest_Path (M1, M2), which returns the shortest path, if any, between member M1 and member M2 (the shortest path is displayed in the form of member identifiers of those members disposed in the shortest path between member M1 and member M2); and Are_Connected? (M1, M2, degrees), which returns the degree of separation corresponding to the shortest path between member M1 and member M2, if the two are connected. If the two are not connected, an error code indicating that the two members are not connected is returned.

For the calculation of the shortest path in the queries listed above, any of the shortest path algorithms for a node network defined by an adjacency list may be used, e.g., breadth first search algorithm. The algorithms for carrying out other calculations that are necessary to process the queries listed above are programmed using conventional techniques.

In FIG. 2, a plurality of distributed graph servers 300 are depicted, and is preferred over a single graph server because the distributed structure permits resources to be shared. However, the present invention may also be practiced with a single graph server.

The application server 200 and the graphs servers 300 are depicted separately in the block diagram of FIG. 2 to illustrate that the two are performing separate processes. The application server 200 and the graphs servers 300 may be housed within a single physical structure, or they may be parts of a single processor that is programmed to carry out their separate processes in parallel.

Figure 4:
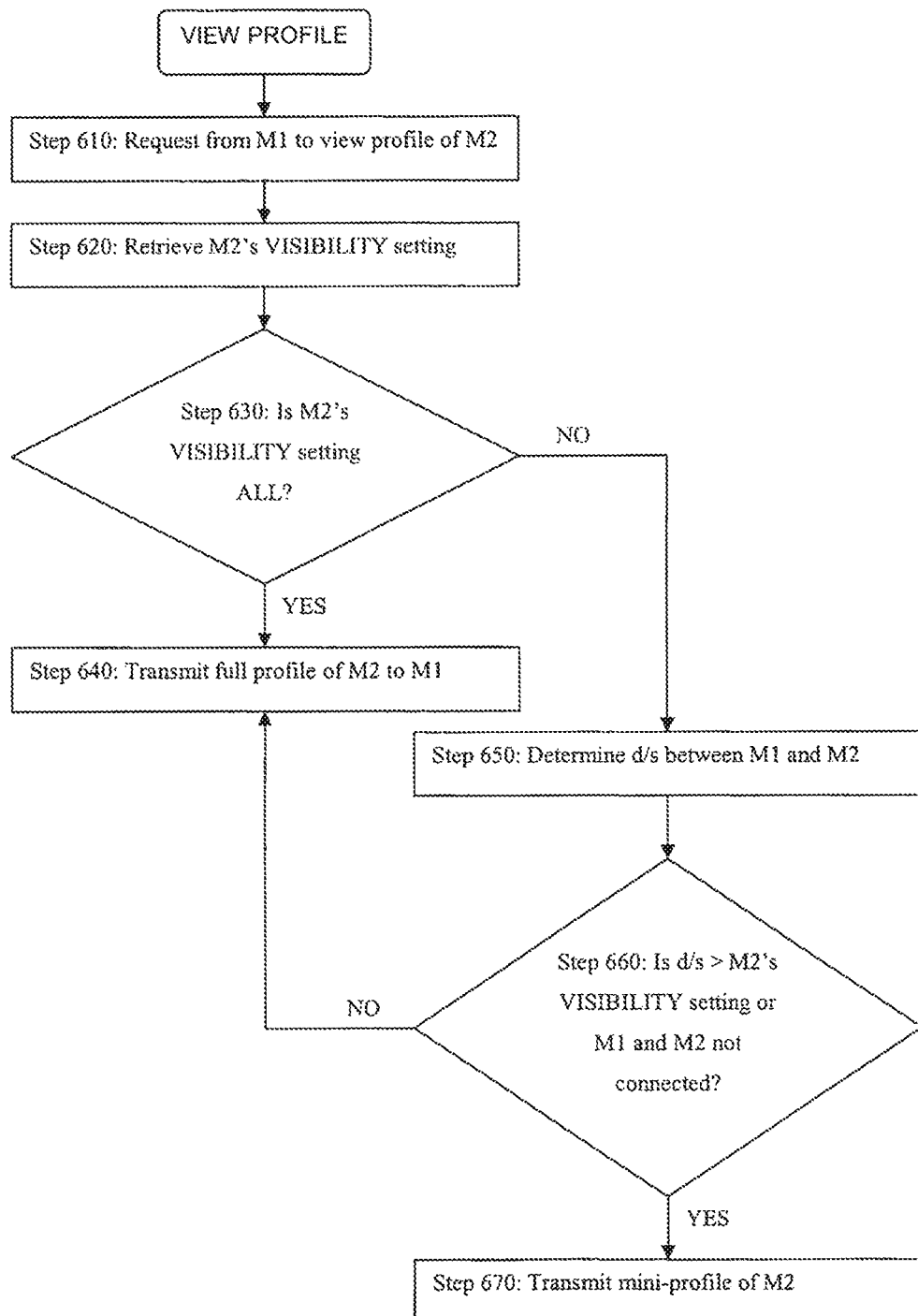
FIG. 4 is a flow diagram illustrating the method for processing a request by one member to view the profile of another member in the system of FIG. 2.

FIG. 4 is a flow diagram illustrating the method for processing a request by one member (e.g., M1) to view the profile of another member (e.g., M2) in the system of FIG. 2. In Step 610, the application server 200 receives a request by member M1 to view the profile of member M2. As an example, this happens when member M1 clicks on a hyperlink associated with member M2. The full profile of member M2 will be displayed if the d/s between M1 and M2 is less than or equal to the VISIBILITY setting set by member M2 or if the VISIBILITY setting set by member M2 is ALL. (VISIBILITY setting may be set at 1, 2, 3 or ALL.) Otherwise, only the mini-profile of member M2 will be displayed. In Step 620, the application server 200 retrieves M2's VISIBILITY setting from the member database 210. If M2's VISIBILITY setting is ALL, the full profile of M2 will be transmitted to M1 for display at M1's computer (Steps 630 and 640). If not, the application server 200 sends the Are_Connected? query to the graph servers 300 to determine the d/s between member M1 and member M2 (Steps 630 and 650). The graph servers 300 execute this query and return the d/s that it computed to the application server 200. If the computed d/s is greater than the VISIBILITY setting or if member M1 and member M2 are not connected, the mini-profile of member M2 and a message indicating that member M2's full profile can only be viewed by members in his or her personal network is transmitted to M1 for display at M1's computer (Steps 660 and 670). Otherwise, the full profile of member M2 is transmitted to M1 for display at M1's computer (Steps 660 and 640).

Figure 5:
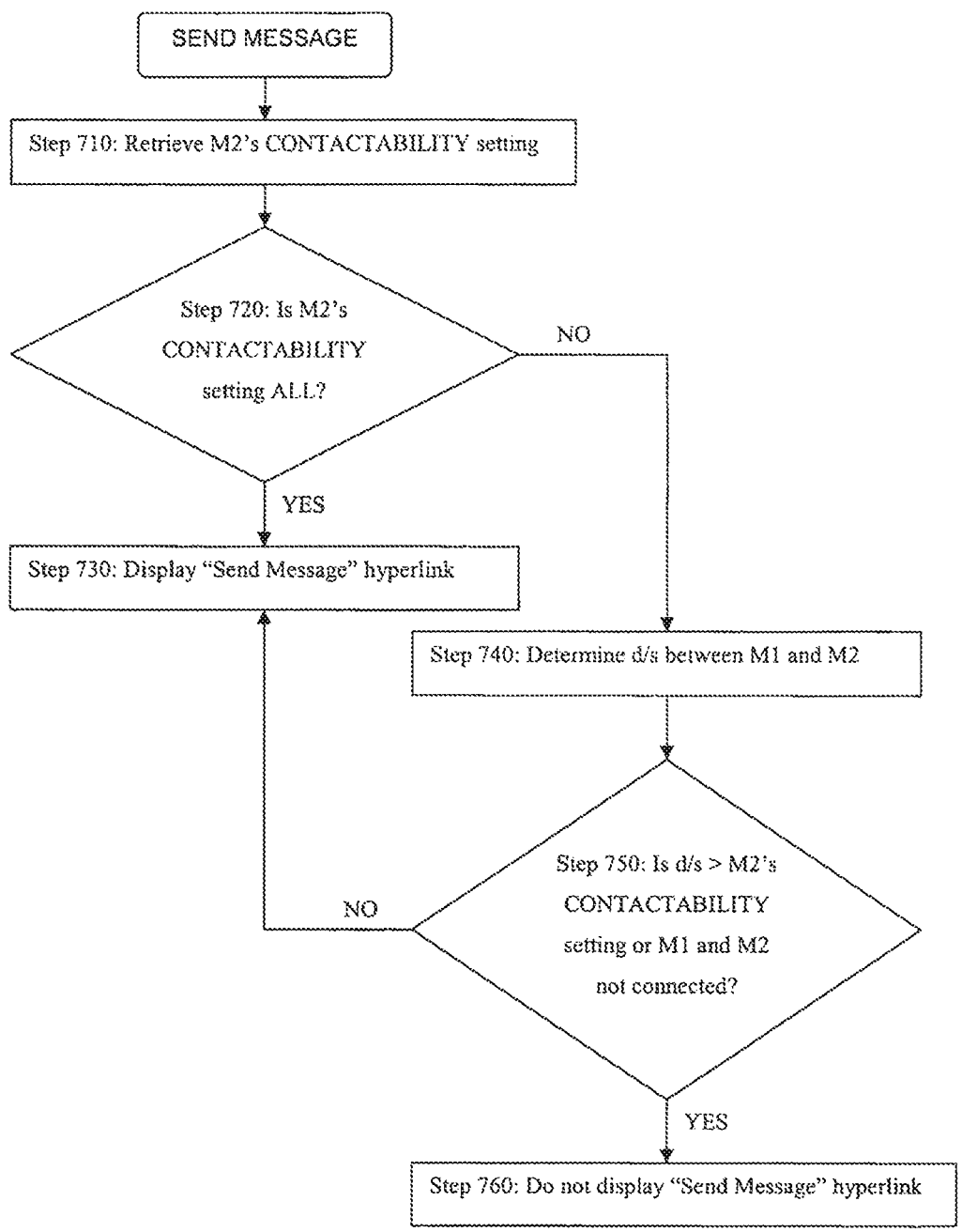
FIG. 5 is a flow diagram illustrating the method for determining whether a member can be contacted by another member in the system of FIG. 2.
Figure 6:
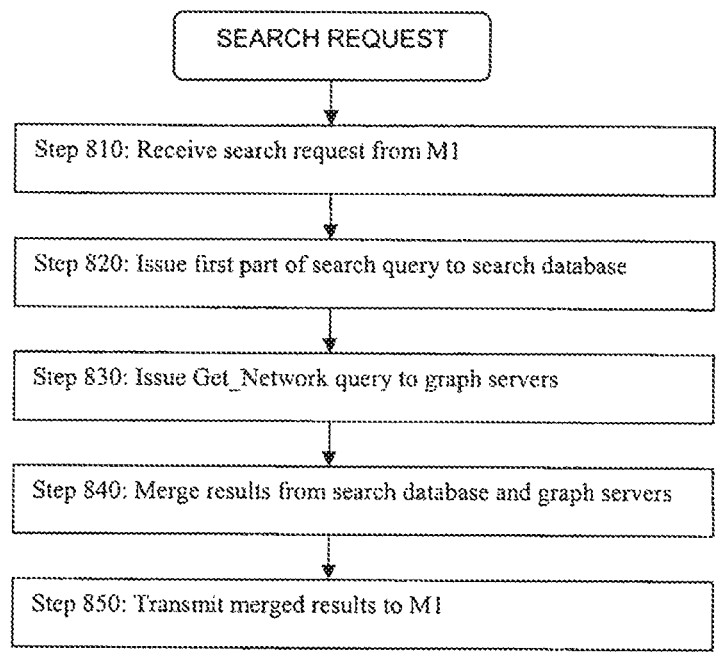
FIG. 6 is a flow diagram illustrating the method for processing a search request in the system of FIG. 2.

FIG. 5 is a flow diagram illustrating the method for determining whether a member can be contacted by another member in the system of FIG. 2. In the example given herein, it is assumed that member M1 is attempting to send a message to member M2. In Step 710, the application server 200 retrieves the CONTACTABILITY setting of member M2. (CONTACTABILITY setting may beset as 1, 2, 3 or ALL.) If M2's CONTACTABILITY setting is ALL, this means that member M2 is permitting contact from anyone, and consequently, when member M1 views member M2's profile, a "Send Message" hyperlink will appear through which member M1 will be able to send messages to member M2 (Steps 720 and 730). If M2's CONTACTABILITY setting is not set to ALL, the application server 200 sends the Are_Connected? query to the graph servers 300 to determine the d/s between member M1 and member M2 (Steps 720 and 740). The graph servers 300 execute this query and return the d/s that it computed to the application server 200. If the computed d/s is greater than the CONTACTABILITY setting or if member M1 and member M2 are not connected, this means that member M2 is not permitting contact from member M1 and the "Send Message" hyperlink will not be displayed when member M1 views member M2's profile (Steps 750 and 760). If the computed d/s is less than or equal to the CONTACTABILITY setting, this means that member M2 is permitting contact from member M1, and consequently, when member M1 views M2's profile, a "Send Message" hyperlink will appear through which member M2 will be able to send messages to member M1 (Steps 750 and 730).

FIG. 6 is a flow diagram illustrating the method for processing a search request in the system of FIG. 2. In Step 810, the application server 200 receives a search query input by member M1. The search query is divided into two parts. The first part specifies search terms for pre-selected categories such as gender, age, interests and location. The second part specifies a d/s setting, which may beset at 1, 2, 3 or ALL. For example, the search query may be: [gender (female), age (less than 30), d/s (at most 2)]. The first part of this search query is [gender (female), age (less than 30)] and the second part of this search query is [d/s (at most 2)]. In Step 820, the application server 200 issues the first part of the search query to the search database 230 to obtain member identifiers for those members whose profiles meet the specified criteria. In Step 830, the application server 200 issues a Get_Network query to the graph servers 300 to obtain a list of member identifiers of all members that are within the d/s specified in the second part of the search query. The application server 200 merges the results from the search database 230 and the graph servers 300 (Step 840), and transmits the merged results to member M1 (Step 850). After the merged results are delivered to member M1, the member may click on any of the results to view that member's profile and, if the "Send Message" hyperlink is displayed, attempt to send a message to that member through that hyperlink.

While particular embodiments according to the invention have been illustrated and described above, it will be clear that the invention can take a variety of forms and embodiments within the scope of the appended claims.

What is claimed:

1. A computer-implemented method comprising:
   receiving, at one or more computing systems from a client device, a query associated with a first user of a social network;
   retrieving, using one or more processors associated with the one or more computing systems, information based on the query, the information representing a user profile associated with a second user of the social network;
   determining, using the one or more processors, a profile format for the user profile based on a visibility preference of the second user specifying a threshold degree of separation, wherein the profile format is set to full profile if a degree of separation between the first user and second user is less than or equal to the threshold degree of separation, the full profile format permitting the first user to view an entirety of the user profile data of the second user, and wherein the profile format is set to mini-profile if the degree of separation between the first user and second user is greater than the threshold degree of separation, the mini-profile format permitting the first user to view only a limited portion of the user profile data of the second user; and
   transmitting information to the client device, based on the profile format, representing the user profile associated with the second user.

2. The method of claim 1, wherein the query comprises an identifier for the second user.

3. The method of claim 1, wherein the threshold degree of separation specified in the visibility preference is 1, 2, 3, or All degrees of separation.

4. The method of claim 3, wherein if the visibility preference is set to All, then setting the profile format to full profile.

5. The method of claim 3, wherein if the visibility preference is set to some value other than "All", then:
   determining, using the one or more processors, the degree of separation between the first user and the second user; and
   comparing the degree of separation to the visibility preference of the second user.

6. The method of claim 5, wherein the determining the degree of separation between the first user and the second user is based on a social graph stored in a dedicated memory device.

7. The method of claim 1, wherein determining the profile format comprises retrieving a visibility preference of the second user from a database.

8. The method of claim 1, further comprising:
   retrieving information indicating a degree of separation between the first user and the second user by accessing a social graph stored in a dedicated memory device.

9. The method of claim 1, further comprising:
   retrieving updates to relationship information from the database; and
   updating the social graph based on the updates to relationship information.

10. One or more machine-readable non-transitory storage media embodying software that is operable when executed by one or more processors associated with one or more computer systems to:
    receive, at the one or more computing systems from a client device, a query associated with a first user of a social network;
    retrieve, from a database, information based on the query, the information representing a user profile associated with a second user of the social network;
    determine, using the one or more processors, a profile format for the user profile based on a visibility preference of the second user specifying a threshold degree of separation, wherein the profile format is set to full profile if a degree of separation between the first user and second user is less than or equal to the threshold degree of separation, the full profile format permitting the first user to view an entirety of the user profile data of the second user, and wherein the profile format is set to mini-profile if the degree of separation between the first user and second user is greater than the threshold degree of separation, the mini-profile format permitting the first user to view only a limited portion of the user profile data of the second user; and transmit information to the client device, based on the profile format, representing the user profile associated with the second user.

11. A system comprising:

a database; and a graph server comprising:
  a dedicated memory device;
  a processor; and
  one or more non-transitory machine-readable storage media comprising software for causing the processor to execute instructions to:
    receive information identifying a first user of a social network and a second user of a social network;
    access a social graph stored on the dedicated memory device; and
  an application server comprising:
    a processor; and
    one or more non-transitory machine-readable storage media comprising software for causing the processor to execute instructions to:
      receive, from a client device, a query associated with a first user of a social network;
      retrieve, from the database, information based on the query, the information representing a user profile associated with a second user of the social network;
      determine a profile format for the user profile based on the visibility preference of the second user specifying a threshold degree of separation, wherein the profile format is set to full profile if a degree of separation between the first user and second user is less than or equal to the threshold degree of separation, the full profile format permitting the first user to view an entirety of the user profile data of the second user, and wherein the profile format is set to mini-profile if the degree of separation between the first user and second user is greater than the threshold degree of separation, the mini-profile format permitting the first user to view only a limited portion of the user profile data of the second user; and
      transmit information to the client device, based on the profile format, representing the user profile associated with the second user.

12. The system of claim 11, wherein the query comprises an identifier for the second user.

13. The system of claim 11, wherein the threshold degree of separation specified in the visibility preference is 1, 2, 3, or All degrees of separation.

14. The system of claim 13, wherein if the visibility preference is set to All, then setting the profile format to full profile.

15. The system of claim 13, wherein if the visibility preference is not set to "All", then:
  determine, using the one or more processors, the degree of separation between the first user and the second user; and
  compare the degree of separation to the visibility preference of the second user.

16. The system of claim 11, wherein the storage media of the graph server further comprises instructions to:
  retrieve updates to relationship information from the database; and
  update the social graph based on the updates to relationship information.

17. The system of claim 11, wherein the storage media of the graph server further comprises instructions to:
  retrieve information indicating a degree of separation between the first user and the second user by accessing a social graph stored in a dedicated memory device.

18. The system of claim 11, wherein determining the profile format comprises retrieving a visibility preference of the second user from a database.

* * * * *